United States Patent
Fröhlich

(10) Patent No.: US 11,895,503 B2
(45) Date of Patent: Feb. 6, 2024

(54) METHOD FOR IMPROVED MEMORY UTILIZATION OF NB-IOT UE WITH INTEGRATED SUBSCRIBER IDENTITY MODULE DURING PROVISIONING

(71) Applicant: SHENZHEN GOODIX TECHNOLOGY CO., LTD., Shenzhen (CN)

(72) Inventor: Martin Fröhlich, Dresden (DE)

(73) Assignee: SHENZHEN GOODIX TECHNOLOGY CO., LTD.

( * ) Notice: Subject to any disclaimer, the term of this patent is extended or adjusted under 35 U.S.C. 154(b) by 590 days.

(21) Appl. No.: 17/134,134

(22) Filed: Dec. 24, 2020

(65) Prior Publication Data

US 2021/0120423 A1 Apr. 22, 2021

Related U.S. Application Data

(63) Continuation of application No. PCT/EP2019/081201, filed on Nov. 13, 2019.

(30) Foreign Application Priority Data

Feb. 5, 2019 (EP) .................................. 19155408
Sep. 4, 2019 (EP) .................................. 19195295

(51) Int. Cl.
*H04L 29/06* (2006.01)
*H04W 12/30* (2021.01)
(Continued)

(52) U.S. Cl.
CPC ............. *H04W 12/35* (2021.01); *H04W 8/18* (2013.01); *H04W 12/06* (2013.01); *H04W 12/40* (2021.01); *G16Y 40/30* (2020.01)

(58) Field of Classification Search
CPC ..... H04W 12/35; H04W 12/40; H04W 12/06; H04W 8/18; G16Y 40/30
See application file for complete search history.

(56) References Cited

U.S. PATENT DOCUMENTS

2015/0347786 A1* 12/2015 Yang ..................... H04W 8/183
726/26
2016/0119146 A1* 4/2016 Anderson ............. H04L 9/0869
380/30
(Continued)

FOREIGN PATENT DOCUMENTS

WO 2015184064 12/2015
WO 2015184064 A1 12/2015

OTHER PUBLICATIONS

European Extended Search Report for corresponding European Application No. 19195295.1-1218 completed Feb. 11, 2020.
(Continued)

*Primary Examiner* — Joseph P Hirl
*Assistant Examiner* — Chi D Nguy
(74) *Attorney, Agent, or Firm* — Emerson, Thomson & Bennett, LLC; Roger D. Emerson; Peter R. Detorre

(57) ABSTRACT

A method for improving memory utilization of a Narrowband Internet of Things device (UE) is provided. The method includes: switching the modem to a provisioning mode and allocating a portion of the dedicated memory of the modem during provisioning of the iSIM on the modem chip of the UE; reusing, by the iSIM, the portion of the dedicated memory of the modem for processing provisioning data; securely cleaning up the allocated portion of the dedicated memory of the modem by a protection hardware block after leaving the provisioning mode; and allocating the portion of the dedicated memory of the modem shared with the iSIM back to the modem.

19 Claims, 1 Drawing Sheet

(51) Int. Cl.
*H04W 12/40* (2021.01)
*H04W 8/18* (2009.01)
*H04W 12/06* (2021.01)
*G16Y 40/30* (2020.01)

(56) References Cited

U.S. PATENT DOCUMENTS

2016/0134318 A1  5/2016 Wane
2020/0396593 A1* 12/2020 Vikberg ................ H04W 12/08

OTHER PUBLICATIONS

Arm: "Unlocking the cellular IoT potential for chipset maker Whitepaper" _XP5666839A, Feb. 1, 2019, pp. 1-7. Retrieved from the Internet: URL: https://learn.arm.com/rs/714-XIJ-402/images/Kigen-Unlocking_whitepaper.pdf.
GSM_Association "iUICC POC Group Primary Platform requirements Approved release Version 1.0" _XP014295117A, ETSI draft; Scpreq (17) 000057, European Telecommunications Standards Institute (ETSI), 650, Route Des Lucioles; F-06921 Sophia-Antipolis; France. vol. WG-SCP Req-SCP-Req, May 17, 2017, pp. 1-43. Retrieved from the Internet: URL: https://www.gsma.com/newsroom/wp-content/uploads/UIC.03_v1.0.pdf.

* cited by examiner

METHOD FOR IMPROVED MEMORY UTILIZATION OF NB-IOT UE WITH INTEGRATED SUBSCRIBER IDENTITY MODULE DURING PROVISIONING

CROSS REFERENCE TO RELATED APPLICATIONS

The present application is a continuation of PCT International application No. PCT/EP2019/081201 filed on Nov. 13, 2019, and entitled "A METHOD FOR IMPROVED MEMORY UTILIZATION OF A NB-IOT UE WITH AN INTEGRATED SUBSCRIBER IDENTITY MODULE (ISIM) DURING PROVISIONING", which claims the priority of the European application No. EP 19155408.8 filed on Feb. 5, 2019, and EP 19195295.1 filed on Sep. 4, 2019, which are hereby incorporated by reference in its entireties.

TECHNICAL FIELD

The disclosure relates to a method for improving memory utilization of a Narrowband Internet of Things device (UE), which comprises a modem and an integrated Subscriber Identity Module (iSIM) each comprising dedicated memory and both are combined on a modem chip.

BACKGROUND

There are standards describing the "classical" SIM/UICC or the embedded version eSIM (https://www.gsma.com/esim/. Consumer benefits of such eSIMs include, that a simpler device setup is possible without the need to insert or replace a SIM card; devices can operate independently of a tethered smartphone, with their own subscriptions; and a range of new, enhanced mobile-connected devices benefit from the standardized eSIM.

At present, integrated SIMs (iSIMs) are not standardized.

All 3GPP based cellular user equipment (UE), also known as Narrowband Internet of Things devices, such as mobile phones, require a mechanism to prove their identity to the cellular network and to exchange keys for a secure connection.

Therefore, the Universal Integrated Circuit Card (UICC) as an example of the hardware, with a USIM application, as an example of the software, running on the hardware, is used. The UICC is a highly secure hardware module that is connected (e.g. wired) in the UE. The USIM application contains all secret keys and provider specific information. The USIM application is provisioned by the cellular operator.

The secret keys inside the USIM application stored on the UICC must not be read out. The keys are used to authenticate the UE against the core network with the help of a cryptographic algorithm. Furthermore, the USIM application generates the secret session keys for the UE.

Thus, each UE requires a USIM application (running on the UICC) to attach to a core network successfully. Adding provider keys and provider specific setting (profile) is called provisioning.

The modem to UICC communication is done via wired serial interface 4 which is standardized in ISO/IEC 7816-3.

The disadvantage of a UICC is that a separated secure hardware element, a SIM card, is required. This causes additional system costs. On the other hand, cost sensitive systems require a solution where the UICC becomes portion of the modem inside the UE. Thus, the integration of the UICC with the USIM application is called for integrated Subscriber Identity Modules (iSIM).

A simple solution for an iSIM is to put the UICC chip and the modem chip in one package (SIP-System in package) or to have the UICC chip as portion of the modem chip (FIG. 1).

SUMMARY

An objective of the disclosure is to further reduce the cost per UE and hence to reduce the chip area and energy consumption of an integrated UICC chip. To achieve the objective of the disclosure, a method for improving memory utilization of a Narrowband Internet of Things device (UE) is provided. The method includes: switching the modem to a provisioning mode and allocating a portion of the dedicated memory of the modem during provisioning of the iSIM on the modem chip of the UE; reusing, by the iSIM, the portion of the dedicated memory of the modem for processing provisioning data; securely cleaning up the allocated portion of the dedicated memory of the modem by a protection hardware block after leaving the provisioning mode; and allocating the portion of the dedicated memory of the modem shared with the iSIM back to the modem All SIMs are blank after production and require a provisioning procedure. During the provisioning the mobile operator stores a unique profile on the SIM. The provisioning takes place in a special operation mode, and not during a "normal" modem operation.

In normal operation mode the iSIM acts as subscriber identification module. It provides the modem the required profile information stored previously by the operator and performs the network authentication. In normal operation mode the modem behaves as a normal modem (normal network communication). Modem 2 and iSIM 3 are using their own dedicated memory as illustrated in FIG. 2 by the hatched areas 5, 6 respectively.

The provisioning is done via a cryptographic secured connection. This requires additional temporary memory, e.g. for signature checking or message handling.

Since the provisioning is a special modem operation mode the modem itself can provide application memory to the iSIM that is usually used during the normal operation by the modem, because in the provisioning mode the modem can be powered off or is only responsible to transfer provisioning data between iSIM and the outside world, thus requiring only a minimum of memory.

In the provisioning mode, the iSIM requires more memory than in the normal operation mode. This is caused by the strong usage of asymmetric cryptography (e.g. for signature checking) and the transferring of a whole profile. Usually, the provisioning is only done once or only a few times during the modem lifetime, for example for updating the profile of the UE, which is usually done when the operator was changed.

The disclosed method for improved memory utilization of a UE during provisioning mode can be also seen as a method of RAM sharing during the provisioning. The main advantage is to reuse the unused modem memory for the iSIM when the system is in provisioning mode and hence the reduced memory footprint of the integrated SIM.

RAM sharing allows a reduction of the iSIM dedicated memory and hence a reduction of the chip size and power consumption.

In a preferred embodiment of the disclosed method, the iSIM uses a memory interface to the allocated memory of the modem for accessing the shared portions of the modem memory during provisioning mode. Memory of the modem is understood to be the same as modem memory.

In another preferred embodiment of the disclosed method, the protection hardware block controls an arbitration of a bus system between the modem and the iSIM for unambiguous utilization of the shared portions of the modem memory.

The reuse of the shared portions of the modem memory must be done in a safe manner. The modem must not be able to access the granted (shared) iSIM memory. And after leaving the provisioning mode the shared modem memory must be cleaned up securely. This is achieved by a protection hardware block. This can be done by a reset or by overwriting the RAM with random data by a routine means.

In a further preferred embodiment of the disclosed method, the iSIM comprises only dedicated memory for providing required profile information and doing network authentication. The memory size for the iSIM is smaller than the memory size needed during provisioning. The advantage of the present disclosed method is that in provisioning mode the iSIM memory is increased with memory of the modem and hence the memory size of the iSIM can be reduced significantly.

BRIEF DESCRIPTION OF THE DRAWINGS

The appended drawings show
FIG. 1 Basic components of an iSIM (state-of-the-art)

DETAILED DESCRIPTION OF THE EMBODIMENTS

The disclosure will be explained in more detail using exemplary embodiments.

Figure 1:
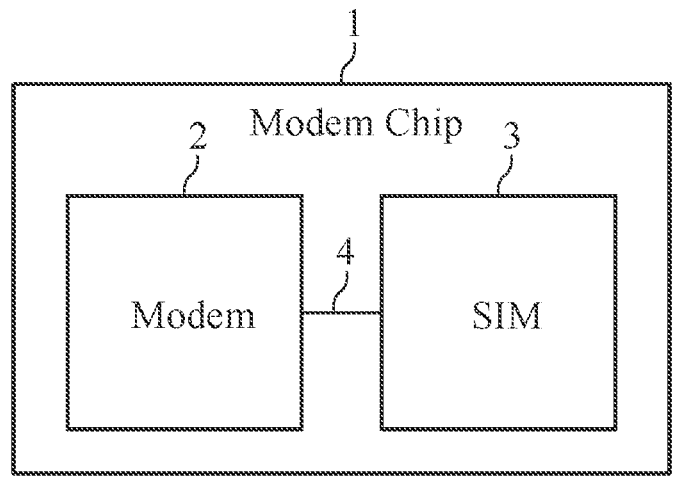
Figure 2:
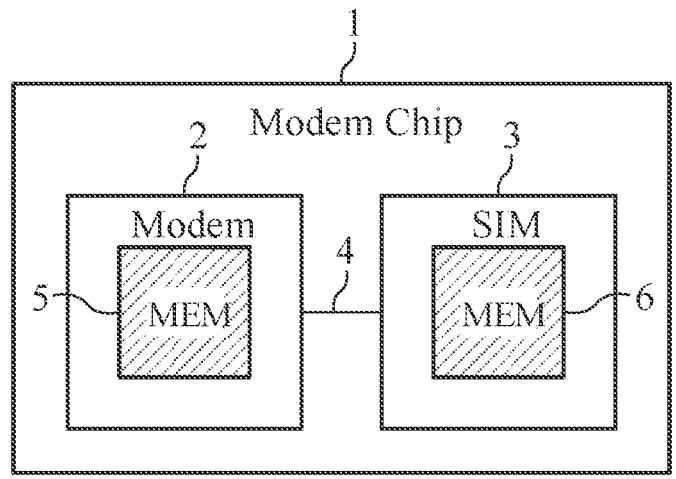
FIG. 2 Modem chip with modem and iSIM and dedicated memories and standardized serial interface (state-of-the-art)
Figure 3:
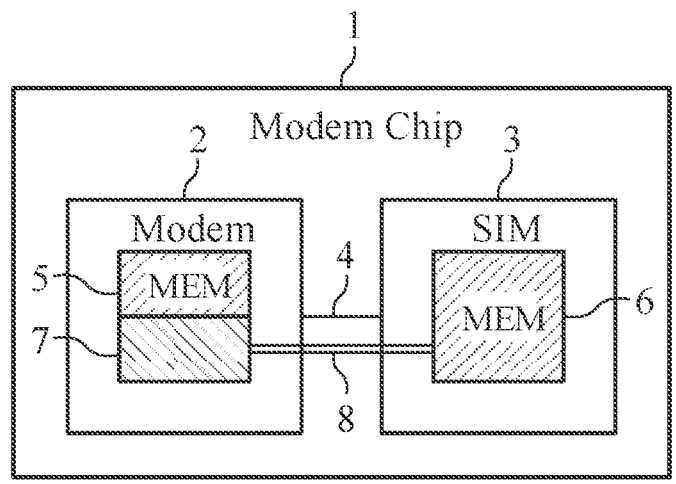
FIG. 3 Disclosed method and hardware realization by reusing allocated portions of the modem memory during provisioning mode.

FIG. 3 illustrates the disclosed method and the hardware-sided sharing of the allocated portions of the modem memory.

The iSIM is in "normal operation" during profile/ID readout. During the normal operation, the USIM application does not require as much memory, so the memory of the modem is not fully used. On the other hand, during the provisioning the USIM application requires more memory. Therefore, during the so-called "provisioning" mode portions of the modem memory may be reused by the iSIM. The advantage is that the iSIM only needs memory for its application. The memory for dynamic runtime storage may be divided.

iSIM applications are rarely active. Classically in NB-IoT devices, when the modem of the UE is turned on (powered-on), IDs are read-out of the iSIM, and the modem communicates with the network and makes an attachment. The network sends secret data to the modem, whereas the modem forwards the data to the iSIM, which computes and checks if the data are correct. The iSIM gives the modem a session key and data which is send back to the network by the modem. After that the iSIM is no longer needed. Hence, with the secure resource sharing as shown by the disclosed method, thus the shared portions of the modem memory and the corresponding access of shared portions by the iSIM lead to a significant reduction of the chip size and energy consumption of the UE.

After leaving the provisioning mode, the modem works in the "normal operation" mode. The allocated portion of the modem memory is cleaned by a protection hardware block (not shown). This is done by a reset or by overwriting the RAM with random data by a routine means, for example by an XOR-mask. Thereof, the memory is cleaned up securely.

Both modes are appropriate for RAM sharing, because the UE does not require full memory during attach (profile/ID readout), or even less during the provisioning.

LIST OF REFERENCE SIGNS 1 modem chip
2 modem
3 integrated Subscriber Identity Module
4 serial interface
5 dedicated modem memory
6 dedicated iSIM memory
7 shared portion of modem memory
8 interface for reuse of shared modem memory by the iSIM

What is claimed is:

1. A method for improving memory utilization of a Narrowband Internet of Things device (UE), the UE comprising a modem and an integrated Subscriber Identity Module (iSIM), the modem and the iSIM comprising respective dedicated memories and both combined on a modem chip, the method comprising:
switching the modem to a provisioning mode and allocating parts of the dedicated memory of the modem exclusively to the iSIM to reduce memory footprint of the iSIM during provisioning of the iSIM on the modem chip of the UE, and the modem is not accessible to the allocated parts of the dedicated memory of the modem during the provisioning mode;
reusing, by the iSIM, the allocated parts of the dedicated memory of the modem for processing provisioning data;
securely cleaning up the allocated parts of the dedicated memory of the modem by overwriting the allocated parts of the modem memory with random data by means of an XOR mask by a protection hardware block after leaving the provisioning mode; and
allocating the parts of the dedicated memory of the modem shared with the iSIM back to the modem.

2. The method for improving memory utilization of a UE according to claim 1, wherein the iSIM uses a memory interface to the allocated parts of the memory of the modem for accessing the allocated parts of the memory of the modem during the provisioning mode.

3. The method for improving memory utilization of a UE according to claim 1, wherein the protection hardware block controls an arbitration of a bus system between the modem and the iSIM for unambiguous utilization of the allocated parts of the modem memory.

4. The method for improving memory utilization of a UE according to claim 1, wherein the iSIM comprises only a dedicated memory for providing required profile information and performing network authentication.

5. The method for improving memory utilization of a UE according to claim 1, wherein a mobile operator stores a unique profile at the SIM during the provisioning mode.

6. The method for improving memory utilization of a UE according to claim 1, wherein the provisioning is done via a cryptographic secured connection which requires additional temporary memory for a signature checking or a message handling.

7. The method for improving memory utilization of a UE according to claim 1, wherein the provisioning mode provides application memory to the iSIM that is used in a normal operation by the modem.

8. The method for improving memory utilization of a UE according to claim 1, wherein in the provisioning mode the modem is powered off or is configured to transfer provisioning data between the iSIM and an outside world.

9. The method for improving memory utilization of a UE according to claim 1, wherein the iSIM requires more memory in the provisioning mode than in a normal operation mode.

10. The method for improving memory utilization of a UE according to claim 1, wherein the provisioning is only done once or only a few times during the modem lifetime.

11. The method for improving memory utilization of a UE according to claim 1, wherein the reuse of the shared parts of the modem memory is done in a safe manner.

12. The method for improving memory utilization of a UE according to claim 11, wherein the shared modem memory is cleaned up securely after leaving the provisioning mode.

13. The method for improving memory utilization of a UE according to claim 1, wherein the iSIM is in a normal operation during profile/ID readout.

14. The method for improving memory utilization of a UE according to claim 13, wherein the modem of the UE is turned on and IDs of the iSIM are read-out of the iSIM.

15. The method for improving memory utilization of a UE according to claim 14, wherein the modem communicates with a network and makes an attachment.

16. The method for improving memory utilization of a UE according to claim 14, wherein a network sends secret data to the modem, whereas the modem forwards the data to the iSIM, which computes and checks whether the data are correct.

17. The method for improving memory utilization of a UE according to claim 13, wherein the iSIM gives the modem a session key and data that are sent back to a network by the modem.

18. The method for improving memory utilization of a UE according to claim 1, wherein during the provisioning mode parts of the modem memory are reused by the iSIM.

19. The method for improving memory utilization of a UE according to claim 1, wherein the modem works in a normal operation mode after leaving the provisioning mode.

* * * * *